United States Patent
Mahapatra et al.

(10) Patent No.: US 10,832,094 B2
(45) Date of Patent: Nov. 10, 2020

(54) GENERATING HYPERSPECTRAL IMAGE DATABASE BY MACHINE LEARNING AND MAPPING OF COLOR IMAGES TO HYPERSPECTRAL DOMAIN

(71) Applicant: International Business Machines Corporation, Armonk, NY (US)

(72) Inventors: Dwarikanath Mahapatra, Melbourne (AU); Susmita Saha, Doncaster East (AU); Arun Vishwanath, Blackburn (AU); Paul R. Bastide, Boxford, MA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 15/949,528

(22) Filed: Apr. 10, 2018

(65) Prior Publication Data
US 2019/0311230 A1    Oct. 10, 2019

(51) Int. Cl.
*G06K 7/14*    (2006.01)
*G06K 9/62*    (2006.01)
(Continued)

(52) U.S. Cl.
CPC .......... *G06K 9/6267* (2013.01); *G06F 16/29* (2019.01); *G06F 16/5838* (2019.01);
(Continued)

(58) Field of Classification Search
CPC .......... G06K 9/00; G06K 9/627; G06F 16/29; G06F 16/5838; G06T 7/0004; G06N 20/00
See application file for complete search history.

(56) References Cited

U.S. PATENT DOCUMENTS 7,999,674 B2    8/2011  Kamen
8,439,683 B2 *  5/2013  Puri .................. G09B 19/0092
                                                    434/127
(Continued)

FOREIGN PATENT DOCUMENTS

WO      2012159012 A1    11/2012

OTHER PUBLICATIONS

IBM, "IBM Chef Watson", https://www.ibmchefwatson.com/community, Accessed on Apr. 9, 2018, 2 pages.
(Continued)

*Primary Examiner* — Gregory M Desire
(74) *Attorney, Agent, or Firm* — Scully, Scott, Murphy & Presser, P.C.; Joseph Petrokaitis (57) ABSTRACT

Color images of food a user consumes, text information associated with the food and audio information associated with the food may be received. Color images are converted into hyperspectral images. A machine learning model classifies the hyperspectral images into features comprising at least taste, nutrient content and chemical composition. A database of food consumption pattern associated with the user is created based on classification features associated with the hyperspectral images, the text information and the audio information. A color image of local food may be received and converted into a hyperspectral image. The machine learning model is run with the hyperspectral image as input, and outputs classification features associated with the local food. Based on whether the classification features associated with the local food satisfies the food consumption pattern associated with the user, the local food may be recommended.

19 Claims, 8 Drawing Sheets

(51) Int. Cl.
  *G06T 7/00* (2017.01)
  *G06N 20/00* (2019.01)
  *G06F 16/29* (2019.01)
  *G06F 16/583* (2019.01)
(52) U.S. Cl.
  CPC ............ *G06N 20/00* (2019.01); *G06T 7/0004* (2013.01); *G06T 2207/10024* (2013.01); *G06T 2207/20081* (2013.01); *G06T 2207/30128* (2013.01)

(56) References Cited

U.S. PATENT DOCUMENTS

| 10,274,420 | B2* | 4/2019 | Akhtman | G01J 3/2823 |
| 10,282,641 | B2* | 5/2019 | Jain | G06K 9/481 |
| 10,580,170 | B2* | 3/2020 | Robles-Kelly | G01J 3/2823 |
| 2002/0004749 | A1 | 1/2002 | Froseth et al. | |
| 2008/0267444 | A1 | 10/2008 | Simons-Nikolova et al. | |
| 2009/0087033 | A1* | 4/2009 | Chao | A22C 21/00 382/110 |
| 2011/0318717 | A1 | 12/2011 | Adamowicz | |
| 2012/0083669 | A1 | 4/2012 | Abujbara | |
| 2014/0267684 | A1 | 9/2014 | Nelson et al. | |
| 2016/0350715 | A1 | 12/2016 | Minvielle | |
| 2018/0232689 | A1* | 8/2018 | Minvielle | G06Q 10/087 |
| 2019/0311230 | A1* | 10/2019 | Mahapatra | G06K 9/6267 |

OTHER PUBLICATIONS

"FooDB", http://foodb.ca/, Accessed on Apr. 10, 2018, 2 pages, Version 1.0.
Coxworth, B., "New smartphone camera could tell you what things are made of", http://newatlas.com/unispectral-hyperspectral-imaging-smartphone-camera/36858/, Apr. 2, 2015, Accessed on Apr. 9, 2018, 2 pages.
American Cancer Society, "Diet and Physical Activity: What's the Cancer Connection?", http://www.cancer.org/cancer/cancercauses/dietandphysicalactivity/diet-and-physical-activity, Last Medical Review: Jun. 30, 2014, Last Revised: Apr. 14, 2017, Accessed on Apr. 9, 2018, 7 pages.
National Sleep Foundation, "Shift Work Disorder, Tips for Healthy Eating and Exercising When Working Shifts", https://sleepfoundation.org/shift-work/content/tips-healthy-eating-and-exercising-when-working-shifts, Accessed on Apr. 9, 2018, 3 pages.
Park, A., "It Doesn't Matter How Much You Exercise If You Also Do This", http://time.com/3672428/exercise-sitting/, Jan. 19, 2015, Accessed on Apr. 9, 2018, 3 pages.
Johns Hopkins Medicine, "Risks of Physical Inactivity", http://www.hopkinsmedicine.org/healthlibrary/conditions/cardiovascular_diseases/risks_of_physical_inactivity_85,P00218/, Accessed on Apr. 9, 2018, 2 pages.
Alexander, S., "The product that will let you 'taste' food pictures on your phone", http://www.telegraph.co.uk/foodanddrink/foodanddrinknews/11506471/The-product-that-will-let-you-taste-food-pictures-on-your-phone.html, Mar. 31, 2015, Accessed on Apr. 9, 2018, 2 pages.
Corrine, R., "A Complete Fitness & Meal Plan for Travelers", http://www.bootsnall.com/articles/10-01/a-complete-fitness-meal-plan-for-travelers-the-wanderlust-workout.html, Accessed on Apr. 9, 2018, 10 pages.
Berardi, J., Ph.D., "Frequent flyer fitness", http://www.precisionnutrition.com/frequent-flyer-fitness, Accessed on Apr. 9, 2018, 12 pages.
Goldman, E.G., "The Frequent Traveler's Guide to Staying Healthy", http://www.sparkpeople.com/resource/wellness_articles.asp?id=1691, Dec. 6, 2011, Accessed on Apr. 9, 2018, 4 pages.
Travel Fitness, "Diet and Exercise Guidelines to Help Frequent Travelers Feel & Perform Better on the Road", http://www.travelfitnes.com/, Accessed on Apr. 10, 2018, 3 pages.
SRI International, "Food Recognition Technology", https://www.sri.com/engage/products-solutions/food-recognition-technology, Accessed on Apr. 9, 2018, 4 pages.
Smartplate, "Eating smart just got smarter", https://getsmartplate.com/, Accessed on Apr. 9, 2018, 16 pages.
Takahshi, D., "Scio: This device tells you the chemical makeup of your food, drinks, and pills", VentureBeat, https://venturebeat.com/2014/04/29/scio-handheld-sensor-can-decipher-the-chemical-makeup-of-food-pills-and-plants/, Apr. 29, 2014, Accessed on Apr. 11, 2018, 6 pages.

* cited by examiner

GENERATING HYPERSPECTRAL IMAGE DATABASE BY MACHINE LEARNING AND MAPPING OF COLOR IMAGES TO HYPERSPECTRAL DOMAIN

FIELD

The present application relates generally to computers and computer applications, and more particularly to machine learning and creating hyperspectral images.

BACKGROUND

Currently there is a lack of a database that can provide information about food in different locations. Frequent travelers travel between different locations due to professional commitments or for leisure. They face the problem of finding the right kind of food in a new environment, which is also compatible with their health. The problem is further compounded when there are other considerations such as health and religious issues, adherence to a fitness regime, and culinary taste. Moreover, choosing the right kind of food also has cultural implications as it can help a person easily integrate in a new social setting. This kind of information is never easy for a person to gather and assess in a new place. As a result it creates problems in adapting to new cultural setting. Dining, eating out, and culinary practices are a very effective and informal way to break cultural barriers since food and eating are universal. However, it is important that a traveler has the right information to make decisions that would facilitate easier cultural integration. While there may be some general advisories and blogs written based on bloggers' experiences, such advisories and blogs may be subjective. Existing systems for menu recommendation do not provide the right kind of information, as they do not factor in the dietary requirements of a traveler or any medical situations.

BRIEF SUMMARY

A method and system are disclosed that generate hyperspectral images by machine learning and provide cognitive dietary assistant which may map color images to hyperspectral domain. The method, in one aspect, may include receiving input comprising at least color images of food a user consumes, text information associated with the food and audio information associated with the food. The method may also include converting the color images into hyperspectral images. The method may further include generating output classification comprising at least taste, nutrient content and chemical composition features associated with the food the user consumes, by a machine learning model learned to classify input comprising the hyperspectral images. The method may further include creating a database of food consumption pattern associated with the user based on the output classification features associated with the hyperspectral images, the text information and the audio information. The method may also include determining a geographical location of the user. The method may also include determining availability of local food at the geographical location. The method may further include receiving as input a color image of the local food. The method may also include converting the color image of the local food into a hyperspectral image. The method may also include executing the machine learning model with the hyperspectral image of the local food as input, the machine learning model classifying the hyperspectral image of the local food into features comprising at least taste, nutrient content, and chemical composition. The method may also include determining whether the features associated with the local food satisfy the food consumption pattern associated with the user specified in the database. The method may further include, responsive to determining that the features associated with the local food satisfy the food consumption pattern associated with the user specified in the database, recommending the local food.

A system, in one aspect, may include at least one hardware processor and a memory device coupled to the at least one hardware processor. The at least one hardware processor may be operable to at least: receive input comprising at least color images of food a user consumes, text information associated with the food and audio information associated with the food; convert the color images into hyperspectral images; generate output classification comprising at least taste, nutrient content and chemical composition features associated with the food the user consumes, by a machine learning model learned to classify input comprising the hyperspectral images; create a database of food consumption pattern associated with the user based on the output classification features associated with the hyperspectral images, the text information and the audio information; determine a geographical location of the user; determine availability of local food at the geographical location; receive as input a color image of the local food; convert the color image of the local food into a hyperspectral image; execute the machine learning model with the hyperspectral image of the local food as input, the machine learning model classifying the hyperspectral image of the local food into features comprising at least taste, nutrient content, and chemical composition; determine whether the features associated with the local food satisfy the food consumption pattern associated with the user specified in the database; and responsive to determining that the features associated with the local food satisfy the food consumption pattern associated with the user specified in the database, recommend the local food.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A hyperspectral food imaging system, method and technique are presented. In some embodiments, the system and/or method may create a database of hyperspectral images, for example, for deriving information of chemical and molecular composition. In some embodiments, to create the database, the system and/or method of the present disclosure may include training a machine, for example, via one or more machine learning algorithms such as neural networks and sparse encoding. The machine learning algorithm (or method and system) in some embodiments of the present disclosure allows the machine to learn a mapping between color images (CI) and hyperspectral images (HI). The learned system may then take an input CI and generate a corresponding HI. The corresponding HI in some embodiments provides a rich set of information, including but not limited to, taste, freshness, contamination and other information about a food item.

Such imaging system in some embodiments may inform the user of the best food choices that are suitable for the user and are available at a location. The built database and associated analytics may also help in cultural integration, and for example, help travelers in new or unfamiliar geographic locations and inform them of the kind of food available and alternatives to maintain a healthy lifestyle, and help them integrate better with the local culture. The system and/or method of the present disclosure in some embodiments may provide automatic identification or selection of food that would suit a traveler based on the traveler's dietary requirements, medical conditions and preferences, avoid food that might be harmful for them. For example, the system and/or method may function as a tool that recommends the right kind of food items for an individual in a new location based, for example, on the individual's taste, preferences, health considerations, dietary requirements, as well as local availability, culinary taste. The recommendation in some embodiments takes into account the available food in the new region as well as cultural sensitivities of the local population. The system and/or method in some embodiments may fuse information from the following sources: 1) color images obtained from a smart phone; 2) a culinary database comprising detailed information about various aspects of food items in different places. In some embodiments, the system and/or method may suggest what foods to eat in public and/or give as gifts to guests or others. The system and/or method may aid not only travelers, but others as well, for example, hosts who may have guests from a culture they are not familiar with, in work-related scenarios, and/or others. Further, the system and/or method may aid restaurants and/or enterprises to decide on the kind of food they should advertise.

An individual's diet is unique owing to factors like culture, health and fitness considerations, taste and preference for certain food. When visiting a new place it might be difficult for an individual to locate the kind of food the individual is familiar with. Moreover, the individual's preferred food may not be appropriate culturally. Getting the kind of food that would provide balanced nutrition and at the same time adhere to cultural sensibilities is helpful to the individual, and allows the individual to be able to quickly integrate with the local populace.

In some embodiments, a database is created that stores a user's diet preference using input of the user's food intake. For example, creating the database may include obtaining information from user inputs, for example, through photographs, audio or text about the user's diets. The raw input is then analyzed to extract meaningful information such as the user's food preferences, and the user's food consumption pattern in a period such as in a day or in a week. The system is able to take inputs about raw food items (e.g., broccoli, orange, cucumber) and cooked food items. If the inputs are images, the system of the present disclosure in some embodiments identify and verify the food name and associated food value such as the calorie, color, plant family, ingredients, nutrients, from a hyperspectral image database and culinary database. Such databases may include, but are not limited to, IBM® Chef Watson, from International Business Machines Corporation, Armonk, N.Y. For instance, data sources with information on foods may be accessed to obtain such information. For the hyperspectral images, a first source from a foods database may be used in conjunction with hyperspectral image such that a correlating database of hyperspectral images and normal food images is generated. The hyperspectral image database is populated by training a machine learning model to determine various aspects about the food in the image.

In some embodiments, creating the database may also include obtaining information from a user's calendar, medical history, general health data and wearables, and analyzing and extracting an individual's Diet Index (DI) comprising the following information: The user's average calorie intake and the user's ideal daily calorie, for example, according to the user's activity pattern, energy expended and/or calories burned; and beneficial or restricted foods according to the user's health condition. The DI in some aspects is a collection of values such as: 1) total calorific value of food intake; 2) calories burned throughout the day; and 3) quantification of user's physical data such as the number of steps taken in a day, total heartbeat and average heartbeat rate every 30 minutes.

In some embodiments, a recommended food list is created for the user according to the user's preference, consumption pattern and health goals. For example, on weekdays there may be less activity and hence less food intake while on weekends there is more food intake due to outdoor activity and gym sessions. Such recommendation contributes toward the creation of a personalized database with implicitly embedded individual preferences.

In some embodiments, historical food items are clustered according to their similarity in the spectral data from associated hyperspectral images. These types of broad-perspective clusters in some embodiment represent food taste, ingredients, nutrient, color and medicinal property based clusters. Small clusters may also be formed according to each of these criteria separately, if information available.

For example, hyperspectral cameras output images of varying color depending upon the band range at which the object is imaged. Depending upon the chemical composition of the cooked or raw food, the output images will have different appearances. In some embodiments, such information is used to train a classifier that can classify foods as "sweet", "sour", "spicy", and/or another classification, based on images, and help to build taste-based food clusters. In some embodiments, classifiers may also be trained to identify the individual ingredients of some food preparations. Such classification or identification may be suitable for persons with allergy to specific foods.

The clustering of the food may be based on molecular similarity, ingredient and/or source. The system and/or method of the present disclosure may take into account the locations of the food item, for example, source and/or destination of the ingredients. In some aspects, the chemical and/or molecular composition of a food item is determined from hyperspectral image analysis and based on the percentage of each ingredient, the food item is represented as a point in a high dimensional space, which can be used to cluster them into different groups. In some aspects, for non-numerical attributes (e.g., name of source, or another non-numerical attribute), the classification may be performed in a hierarchical manner using trees. In some aspect, the classification of non-numerical attributes may be also performed in a quantifiable manner using the latitude and longitude coordinates of the geography. Thus, for example, in some embodiments, historical food items are clustered according to their geographical availability. The geospatial availability may be accounted for in longitude-latitude-altitude format.

To create a database of hyperspectral images, for example, for deriving information of chemical and molecular composition, the system and/or method in some embodiments create a machine learning method and system (e.g., neural networks, sparse encoding, and/or others) that learns the mapping between color images (CI) and hyperspectral images (HI). The learned system can then take an input CI and generate the corresponding HI. A classifier is built that classifies HI into attributes or features such as, but not limited to, taste, freshness, and contamination. The classifier may be built or learned by a machine learning algorithm.

For instance, when an individual is travelling to a location about which the individual has not much idea about the kind of available food, the system and/or method of the present disclosure is able to provide a list of food items the individual can eat that will meet the individual's daily (or other periodic) dietary requirements (e.g., required number of calories and a balance of different nutrients), avoid foods harmful for health (e.g., avoid specific food types for diabetics or another health condition), satisfy taste (e.g., preference for foods of specific taste) and/or culinary choices (e.g., local culinary specialties).

To generate this new food list in a location (e.g., a new unfamiliar place to an individual), the system and/or method in some embodiments map the user's normal food list to a different food list which are available in the new location and is best suited for the user's diet, based on the user's choice of parameters (e.g., broad-view or individual matching criteria such as color, nutrients, plant family, and/or others).

While making recommendations, the system and/or method in some embodiments is also able to take into consideration other real-time factors in a specific location such as prevalence of a certain disease among the plant population which might make certain foods unfit for consumption, prevalence of disease among human population in order to take precautions about certain food items, for example, by collecting information from the current warning databases.

In some embodiments, a trained machine or model, for example, trained by a learning system or machine learning algorithm is able to generate or obtain a corresponding HI from a CI of a food item. This source of information further facilitates decision making and list generation of food items. For instance, a user may take the image of the food and the trained model or system identifies the taste, nutrient content, family, allergen information, degree of freshness, molecular composition and any possible contamination. In the absence of database or historical information of food type for a particular region, HI images are very effective in determining a new food's similarity with the user's preferred food.

Generation of hyperspectral imaging data provides a useful approach to validate the quality and ingredients of eatables. By employing the hyperspectral imaging data generated by the system and/or method of the present disclosure, the system and/or method of the present disclosure in some embodiment may inform the user of the best food choices that are suitable for the user and are available at a location, allowing the user to make informed choices of eatables, facilitating good health and better cultural integration. The system and/or method of the present disclosure in some embodiments generate food choices based on geographical knowledge and also on image data, developing a classification framework that addresses taste classification from images.

Figure 1:
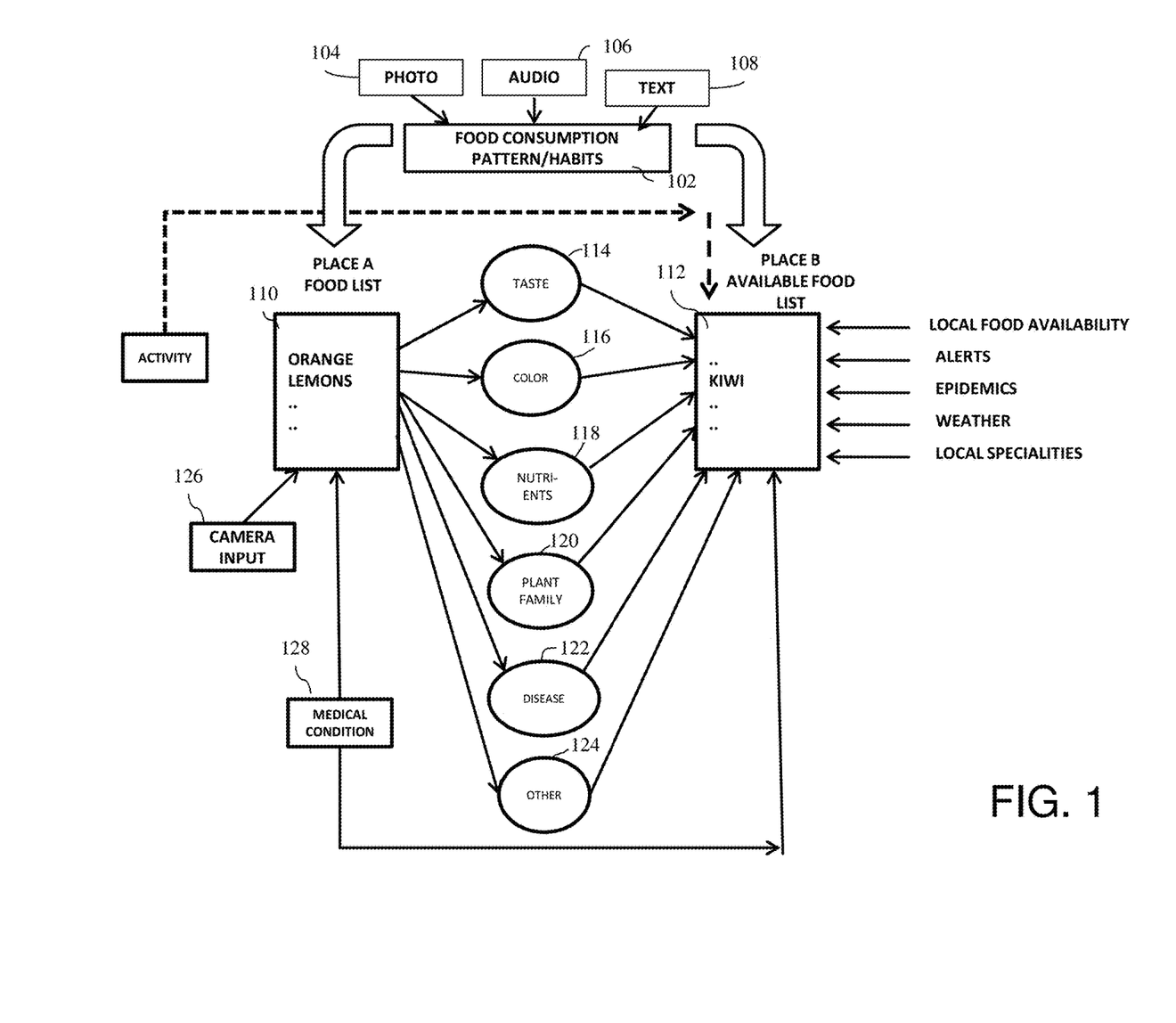
FIG. 1 is a diagram showing a work flow of a cognitive assistant method in one embodiment.

FIG. 1 is a diagram showing a work flow of a cognitive assistant method in one embodiment. Consider that an individual's normal place of residence is place A. The cognitive assistant method may be implemented and executed on at least one hardware processor, for instance, coupled with a memory device. In some embodiments, the system and/or method of the present disclosure creates a database of the individual's food habits 102, for example, based on input data such as images 104, audio data 106 and/or text data 108. The database may store such information for multiple individuals.

Figure 2:
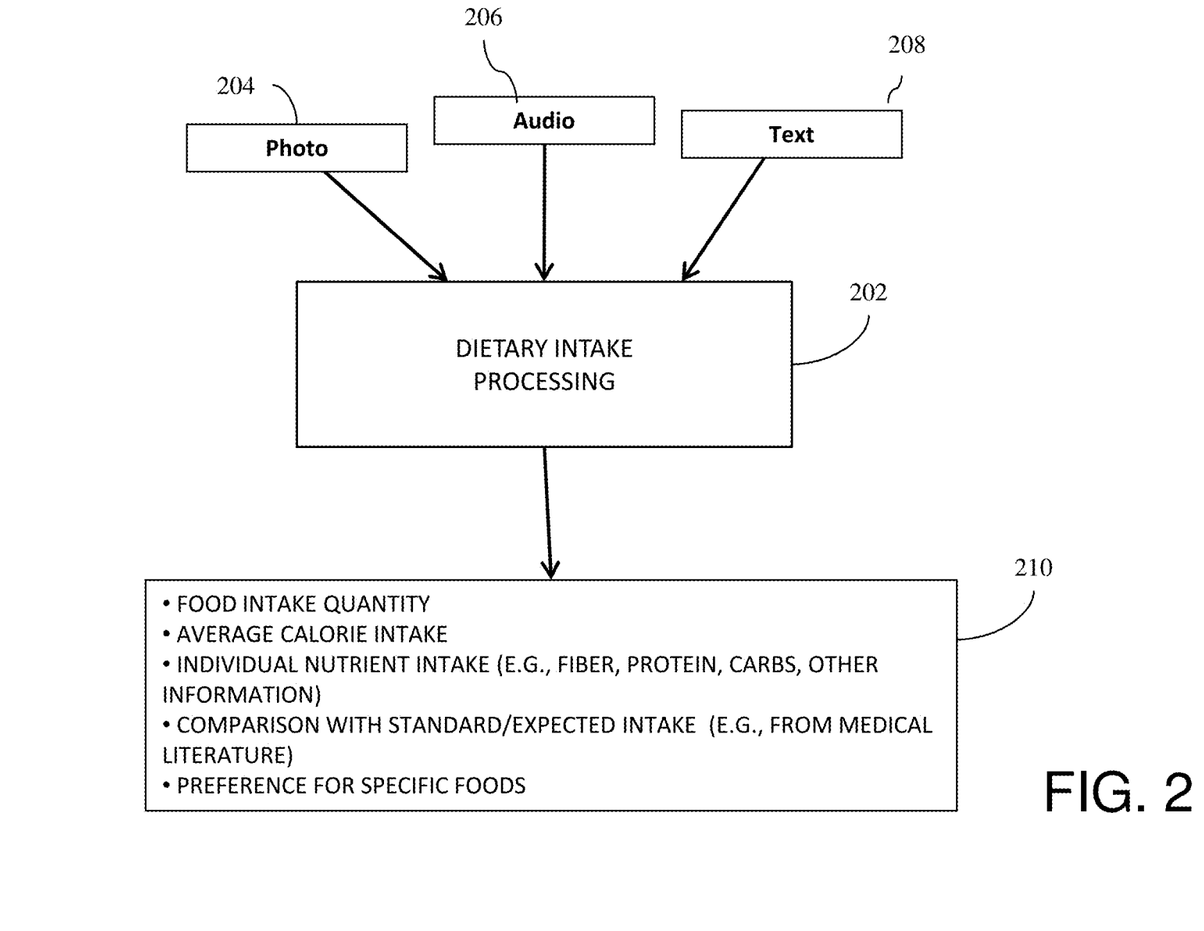
FIG. 2 is a diagram illustrating a working of a dietary intake method or processing module in one embodiment

FIG. 2 is a diagram illustrating a working of a dietary intake method or processing module in one embodiment, for example, executed on a computer or at least one hardware processor, which creates the food consumption pattern database. The dietary intake component 202 in one embodiment takes input about the food intake of a user. It can be in the form of images or photographs 204, audio 206 and/or text 208.

For instance, the user can take and input multiple pictures or images of the user's food. The dietary intake component 202 takes the input images and applies an image recognition technique to recognize the type of food. The dietary intake component 202 may also execute volumetric mesh computation techniques to accurately estimate the quantity of food. The dietary intake component 202 may also take audio input directly from the user, such as "250 grams of pizza with tomato topping, and extra layer of cheese". Another input source may be in the form of text. For example, the user may input text from the ingredients section of packages, or take images of such ingredients section and input the images, in which case text may be recognized from the images. From one or more of these inputs, the dietary intake component 202 may execute specific analytics to calculate the nutrient content of the food such as amount of protein, fiber content, carbohydrates content, and/or other. For instance, the system of the present disclosure recognizes the food type and calculates its quantity. Further image analytics may include generating hyperspectral images from the received color image. Hyperspectral images provide additional details of the quantity of different nutrients in the food. The CI of food is also input to a machine trained model that generates a set of HIs that give information about the food's taste, freshness, composition, contamination level, and/or other information or classification. This information is useful when an existing database does not have adequate information about the food. For instance, the dietary intake component 202 generates based on its input 204, 206, 208, an output 210, which may include food intake quantity, average calorie intake, individual nutrient intake (e.g., fiber, protein, carbohydrates, and/or others), comparison with standard/expected intake (e.g., from medical literature), preference for specific foods.

The extracted information is stored in a database and subsequent analysis outputs a person's or user's daily average intake of different nutrients and preferences for specific types of food, for example, shown at 102 in FIG. 1. For instance, food consumption patterns/habits components may determine and store information such as: 1) quantity of proteins, carbohydrates, fiber content, and/or the like data, consumed daily over a period of time; 2) percentage intake of different food types (e.g., sour, sweet, salty, fruits, vegetables, dairy, etc.); 3) based on physical activity how much each type of food contributes to the energy expended.

The system and/or method in some embodiments may also take into account an individual's daily schedule by accessing information from the user's calendar. The system and/or method, for example, may map the nutrient consumption to the user's daily schedule. This enables the system and/or method to create a reference for normal food intake during days of high and low activity.

The system and/or method may also cluster different foods based on a statistical similarity of their taste, nutrients, color, effectiveness against diseases, and/or others. When the user provides information about a new location (e.g., Place B) that the user is in or will travel to in the future, the system and/or method may access a culinary database and extract information regarding the types of food available at the new location (e.g., Place B), and cluster the food available at the new location into the afore mentioned categories, e.g., taste, nutrients, color, effectiveness against diseases, and/or others. The system and/or method in some embodiments may then map the person's preferences in Place A 110 to the available items in Place B 112 to generate an initial list of food recommendations. For instance, food in Place B 112 that matches or substantially matches the attributes of food in Place A 110, the attributes which may comprise taste 114, color 116, nutrient content 118, plant family 120, disease related attribute 122 and/or another attribute 124. As described above, the system in some aspects stores in its database a person's dietary preferences in a quantitative manner. Using similar analytics, the system in some aspects may generate quantitative measures or numbers for the foods actually available in the area. The system in some aspects may then calculate the similarity between two foods based on multiple parameters or attributes. The foods closest to the user's preferred food are recommended for consumption. Place A food list 110, for example, may be similar to 102 because it is dependent upon the users who actually consumed items. Place B food list 112 describes what may be available in a new place B based on information collected about food availability. The food consumption pattern and habits may be recorded as part of a food log, and/or analysis of social metadata. The food consumption pattern and habits 102 of a user are available for the food item list at both places A and B, and allows for making a decision on which kind of foods are best suited for the individual.

Generating of the place A food list 110 may also include using camera input 126 and medical condition 128, if any, associated with the user. For instance, a camera associated with a user device may capture pictures of food items the user is consuming.

In one aspect, the user's calendar information may provide the user's activity level 130 during different periods of time. The food list recommended at place B 112, for instance, may take into account the user's activity level 130. For example, if it is determined that the user's activity level is low, the recommended list may include low calorie food items. On the other hand, if it is determined that the user's activity level is high, the recommended list may include one or more higher calorie food items. Whether the activity level is high or low may be determined based on comparing the activity level with a predefined threshold value.

Figure 3:
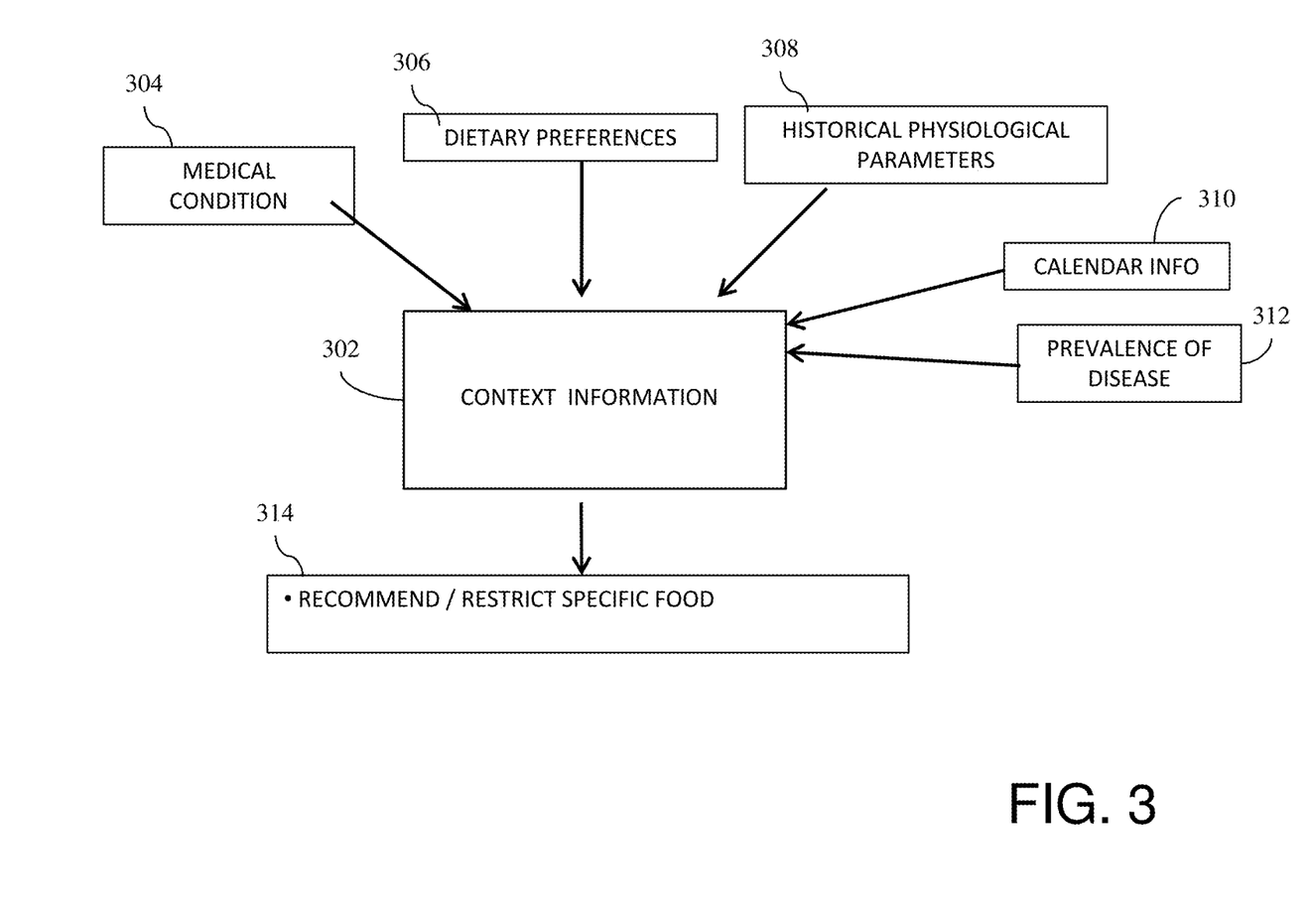
FIG. 3 is a diagram illustrating use of context information in providing a recommendation in one embodiment.

In some embodiments, the recommendation may be further refined by taking into account other context information. FIG. 3 is a diagram illustrating use of context information in providing a recommendation in one embodiment. Context information processing 302 may include receiving as input one or more of, but not limited to, a medical condition or history 304, dietary preferences or requirements 306, physiological parameter history 308, calendar information about user's activity schedule 310, prevalence of disease amongst food items or human population 312 and other relevant sources such as news feed from social networks, and taking into account the context information in recommending food at a location. Based on one or more of such additional information, a recommended or restricted list of specific food 314 may be generated. The system and/or method as described above may be implemented and used, for example, when a person wants to or is interested in buying local items, for example, for eating or cooking. Based on the items recommended by the system and/or method of the present disclosure, a user can also search for eateries that have available dishes with these ingredients. In some aspects, the system of the present disclosure may recommend specific food based on environmental conditions. For example, if a locality has high prevalence of flu like conditions and the user is susceptible to catching a cold, the user may be asked to eat types of foods that strengthen the user's immune system. As another example, if there is a disease outbreak due to a specific food, or there has been past recorded history of such scenarios then the user may be asked to avoid specific foods. The output of the processing shown in FIG. 3 may be input to the processing in FIG. 1 that generates the place B available food list shown at 112 in FIG. 1. For instance, the data or information output in FIG. 3 together with the food item list of place B shown at 112 in FIG. 1 may be used to recommend food items.

Hyperspectral imaging of the present disclosure in some embodiments allows a user to be able to identify the ingredients and a type of preparation involved in cooked food, for example, food prepared at eateries. This information may not be readily available by simply asking relevant persons in the restaurant or cafe. The system and/or method of the present disclosure in one embodiment may overcome this shortcoming by capturing a CI which is used to generate HI. A machine learned model of the present disclosure, for example, generates HI based on input CI.

Figure 4:
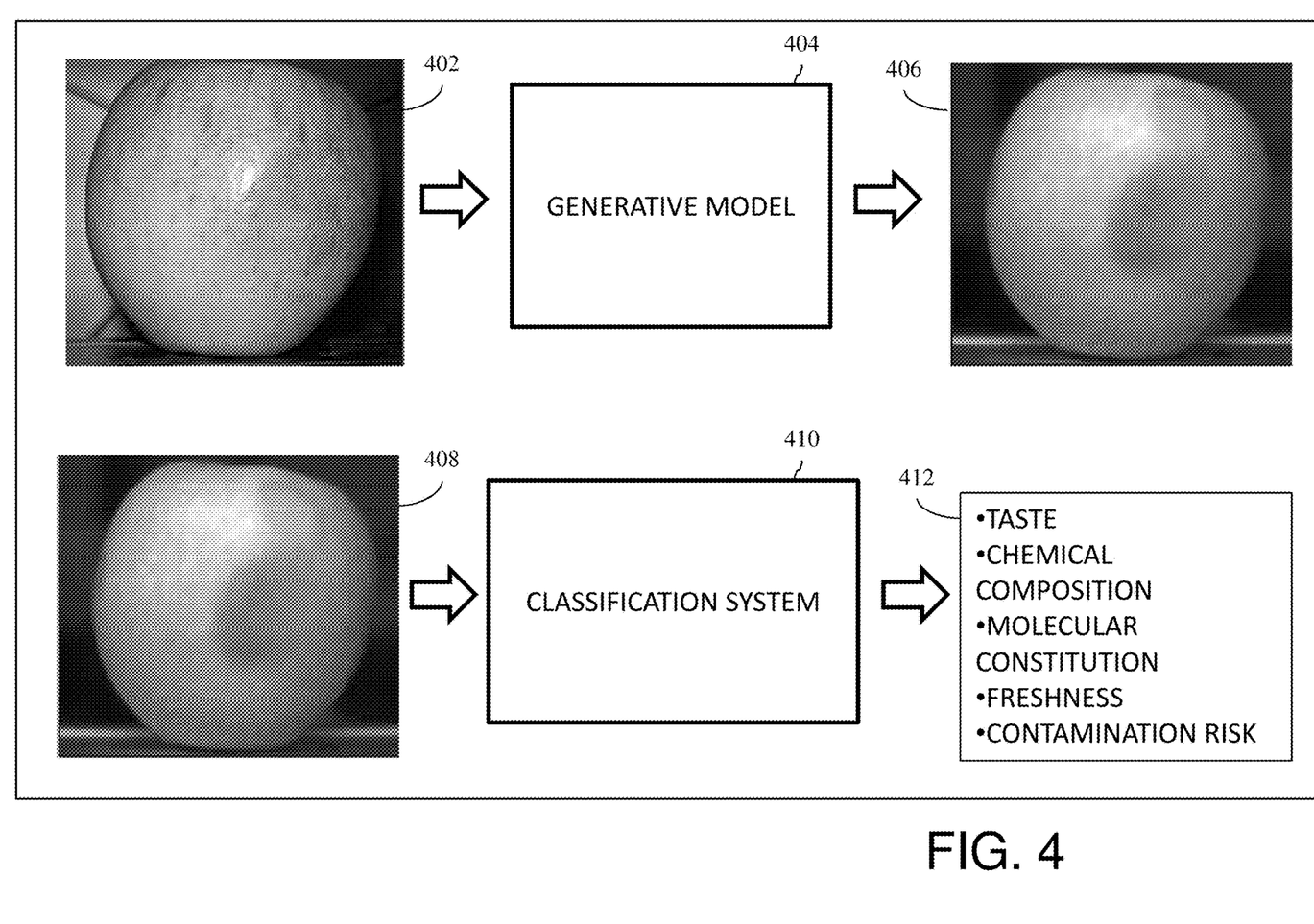
FIG. 4 is a diagram showing a generative and classification system involving CI and HI of the present disclosure in one embodiment.

FIG. 4 is a diagram showing a generative and classification system involving CI and HI of the present disclosure in one embodiment. The system and/or method in one embodiment may learn a transformation model or generative model 404 that can learn to generate HI 406 from the corresponding CI 402 based on a training data set of CI and HI, for example, taken from smartphones (or another device) equipped with a camera capable of capturing color photos as well as a hyperspectral camera. In some aspects, the generative model is a neural network architecture that has been trained on pairs of color images and its corresponding HI image. After training, the neural network learns to accurately reconstruct a HI from a CI.

The generated HI 408 may be used to classify an image based on its taste, freshness, chemical composition, and/or other attributes or features 412, using a pre-trained model (e.g., a classification model) 410 that leverages the training images with their corresponding labels. For instance, quantitative data (e.g., numbers and attributes) representing the nutrient content of the food such as amount of protein, fiber content, carbohydrates content, and/or other, determined by the analytics of the present disclosure, may be input to a trained neural network model that can classify different food types. In some aspects, the classifier neural network is trained on the training CI with the labels taken from user input and historical database.

The pre-trained model, for example, may be built by a classification based system, for example, which takes an image as input and performs the following tasks: 1) learn to differentiate between foods of various tastes; 2) identify ingredients involved in cooked food; 3) freshness of food; 4) identify harmful ingredients for an individual, for example, based on a medical condition. For instance, in some aspects, based on information about food composition and medical corpus a neural network classifier learns whether a food is suitable or harmful for a medical condition. Output from the image based decision system augments the recommendations generated, for example, shown at 112 in FIG. 1. The pre-trained model 410 may also take as input, outputs from a hyperspectral camera, and output the classification features, which for example, may also be used to verify the taste, chemical composition, suitability of eatables, for instance, which can in turn be used to identify poor quality items and ascertain the actual taste. Such classification of hyperspectral imaging can also be used to identify the contents of any kind of packaged food. For instance, in FIG. 1 at 104, a color image may be received and transformed into a hyperspectral image that acts as input to 102.

Figure 5:
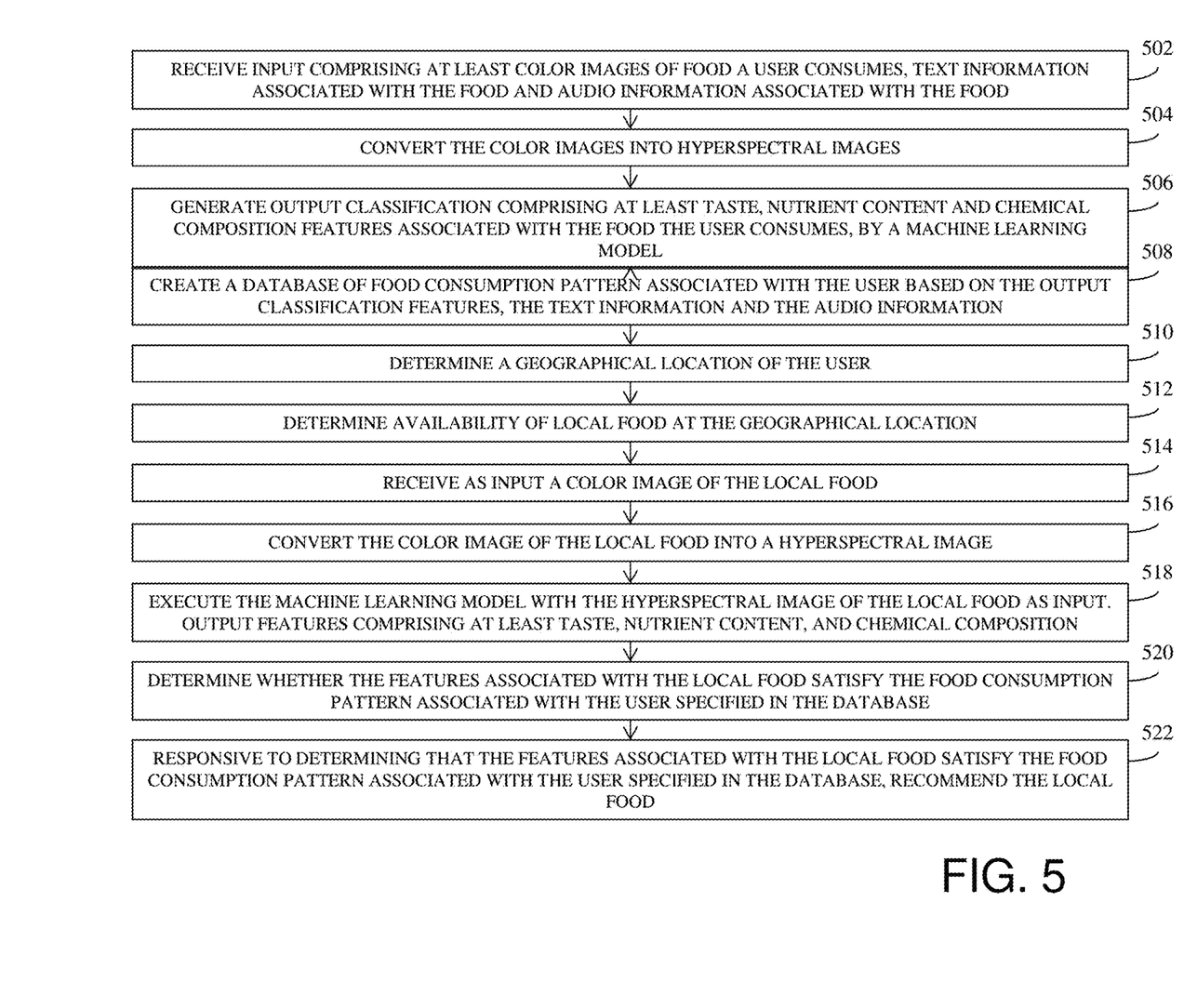
FIG. 5 is a flow diagram illustrating a cognitive assistant method via mapping of color images to hyperspectral domain in one embodiment.
Figure 8:
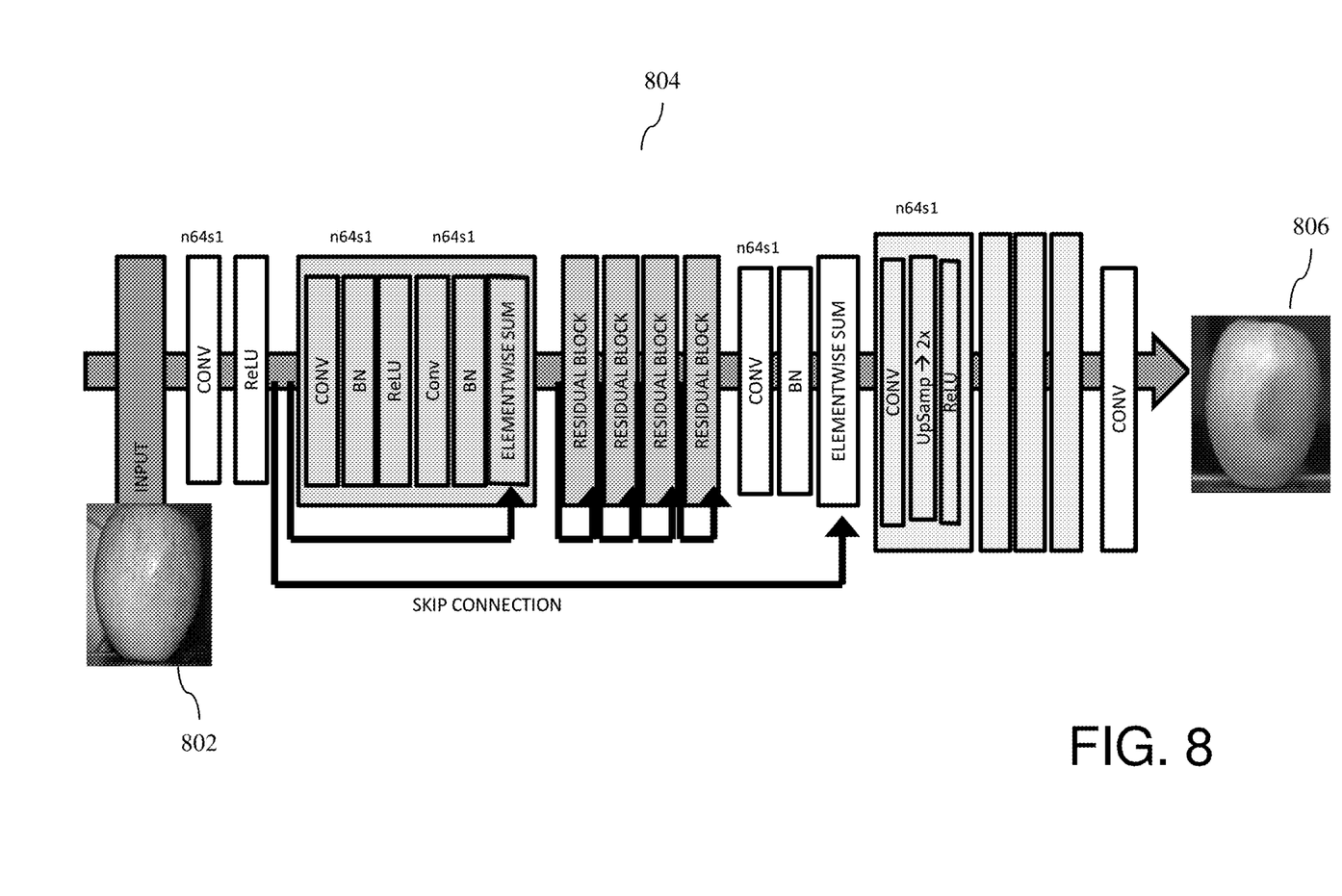
FIG. 8 illustrates an example neural network architecture that transforms a color image into a hyperspectral image in one embodiment.

FIG. 5 is a diagram showing a generative and classification system involving CI and HI of the present disclosure in one embodiment. At 502, input such as color images of food a user consumes, text information associated with the food and audio information associated with the food is received. At 504, the color images are converted or transformed into hyperspectral images. For example, a machine learning model is trained to transform a color image into a hyperspectral image, for example, based on a training set that includes color images and converted hyperspectral images. FIG. 8 illustrates an example neural network architecture that transforms a color image into a hyperspectral image in one embodiment. In some aspects, the transformation is inferential, for example, color+features=hyperspectral. The neural network may be a convolutional neural network with a rectified linear unit (ReLU) as an activation function of the nodes, for example, in the hidden layers, of the neural network. A color image of food item 802 is input to the neural network 804, which outputs a hyperspectral image 806.

At 506, the method may include generating output classification comprising at least taste, nutrient content and chemical composition features associated with the food the user consumes, by running a machine learning model learned to classify input comprising the hyperspectral images. The machine learning model for example may be trained using a training data set comprising historical hyperspectral images labeled with classification features comprising at least taste, nutrient content, and chemical composition. Classification features may also include plant family associated with the food and molecular composition associated with the food. Training data set may be received, and, for example, a machine learning model such as a neural network, may be trained based on the training data set. The neural network receives as input the historical hyperspectral images, or pixel intensity values of the images, and is trained to predict the labels comprising the classification features, e.g., by adjusting weights associated with nodes of the neural network that minimize a cost function of the neural network. Hyperparameters associated with machine learning model such as a neural network may be configured.

At 508, a database of food consumption pattern associated with the user is created based on the output classification features associated with the hyperspectral images, the text information and the audio information.

At 510, a current geographical location of the user may be determined. For instance, the user may input the user's current location, and/or an automated location system may automatically determine the user's location, for example, via system such as a global positioning system (GPS).

At 512, availability of local food at the geographical location is determined. Such information may be input by the user and/or obtained automatically, for example, from a database that stores culinary information about the location.

At 514, a color image of the local food may be received. For example, a user may take a photo of such image, for instance, using a camera, a smartphone, or any other device that captures color images of items. In another aspect, the color image may be acquired automatically by a hardware processor executing the method, for example, by accessing images stored on storage or memory device or devices, for example, in a data store or database.

At 516, the color image of the local food is converted into a hyperspectral image. A transformation model, e.g., another machine learning model trained using a machine learning algorithm, may be run to convert the color image into a hyperspectral image.

At 518, the machine learning model with the hyperspectral image of the local food as input is executed, the machine learning model classifies the hyperspectral image of the local food into features comprising at least taste, nutrient content, and chemical composition.

At 520, it is determined whether the features associated with the local food satisfy the food consumption pattern associated with the user specified in the database. In one aspect, determining whether the features associated with the local food satisfy the food consumption pattern associated with the user specified in the database may also include determining whether the features associated with the local food meet medical dietary restriction of food intake associated with the user. Yet in another aspect, determining whether the features associated with the local food satisfy the food consumption pattern associated with the user specified in the database may also include determining activity level of the user and recommending the local food also based on the activity level of the user.

At 522, responsive to determining that the features associated with the local food satisfy the food consumption pattern associated with the user specified in the database, the local food may be recommended.

Figure 6:
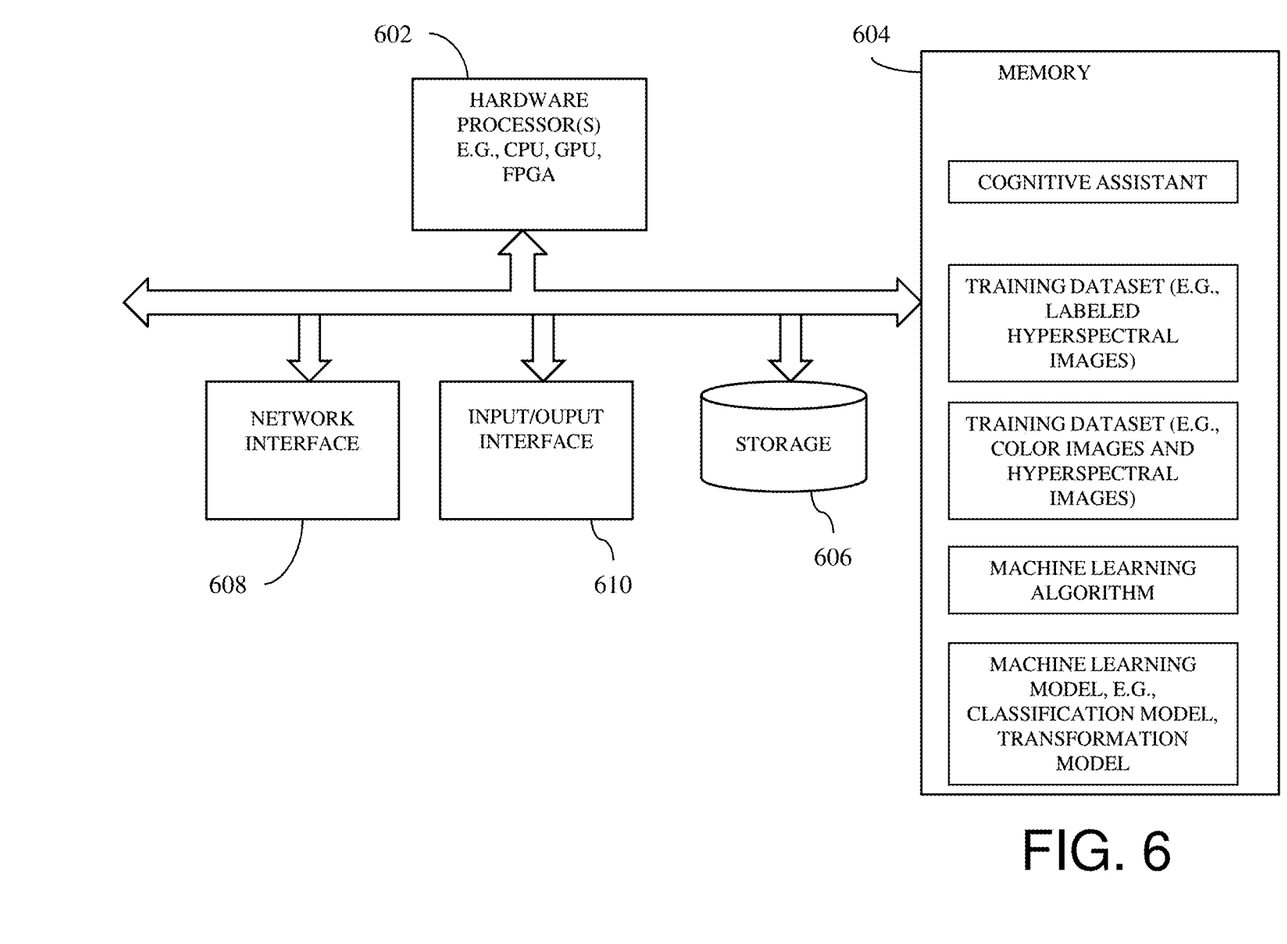
FIG. 6 is a diagram illustrating components of a cognitive assistant with machine learning that trains a machined learning model to classify hyperspectral images in one embodiment.

FIG. 6 is a diagram illustrating components of a cognitive assistant system, which may map color images to hyperspectral domain in one embodiment. One or more hardware processors 602 such as a central processing unit (CPU), a graphic process unit (GPU), and/or a Field Programmable Gate Array (FPGA), and/or another processor, may be coupled with a memory device 604, and run or execute cognitive assistant system. The memory device 404 may, for example, store instructions and/or data for functioning of the one or more hardware processors 602, and may include an operating system and other program of instructions and/or data. The one or more hardware processors 602 may receive input comprising at least color images of food a user consumes, text information associated with the food and audio information associated with the food. The input may be received via an input/output interface 610 and/or via a network interface 608. The one or more hardware processors 602 may convert the color images into hyperspectral images. For instance, at least one hardware processor 602 may train a machine learning transformation model that converts the color image into the hyperspectral image based on a training set comprising a plurality of color images and hyperspectral images. Such training set may be stored in a storage device 606 or received via a network interface 608 from a remote device, and may be temporarily loaded into the memory device 604 for training the transformation model. The trained or learned transformation model may be stored on memory 604, for example, for execution by one or more hardware processors 602.

One or more hardware processors 602 may generate output classification that may include at least taste, nutrient content and chemical composition features associated with the food the user consumes, by executing a machine learning model that learned to classify the hyperspectral images received as input to the machine learning model. For instance, at least one hardware processor 602 may receive a training data set that may include historical hyperspectral images labeled with classification features that may include at least taste, nutrient content, and chemical composition. Additional classification features may include plant family associated with the food and molecular composition associated with the food. At least one hardware processor 602 may train a neural network based on the training data set. For example, the neural network receives as input the historical hyperspectral images and is trained to predict the labels comprising the classification features, by adjusting weights associated with nodes of the neural network that minimize a cost function of the neural network. In another aspect, the machine learning model is trained by sparse encoding. Such training set may be stored in a storage device 606 or received via a network interface 608 from a remote device, and may be temporarily loaded into the memory device 604 for training the machine learning model, for example, a classification model. The trained or machine learned model may be stored on a memory device 604, for example, for execution by one or more hardware processors 602.

One or more hardware processors 602 may create a database of food consumption pattern associated with the user based on the output classification features associated with the hyperspectral images, the text information and the audio information. The database may be stored on a storage device 606.

In one aspect, a geographical location of the user may be determined. For instance, one or more hardware processors 602 may receive from a user's device such as a user's smartphone or another device capable of determining the user's location, the current location of the user. One or more hardware processors 602 may also receive as input a color image of the local food. In one aspect, one or more hardware processors 602 may receive the color image from a user's device, for example, a smartphone or another device that captures the color image of the local food. The one or more hardware processors 602 may convert the color image of the local food into a hyperspectral image, for example, by running a machine learned model, a transformation model. The one or more hardware processors 602 may also execute the machine learning model (e.g., a classification model) with the hyperspectral image of the local food as input, the machine learning model classifying the hyperspectral image of the local food into features which may include at least taste, nutrient content, and chemical composition.

The one or more hardware processors 602 may determine whether the features associated with the local food satisfy the food consumption pattern associated with the user specified in the database, and responsive to determining that the features associated with the local food satisfy the food consumption pattern associated with the user specified in the database, recommend the local food. Whether the features associated with the local food satisfy the food consumption pattern associated with the user specified in the database may also include determining whether the features associated with the local food meet medical dietary restriction of food intake associated with the user. Whether the features associated with the local food satisfy the food consumption pattern associated with the user specified in the database may further include determining activity level of the user and one or more hardware processors 602 may recommend the local food further based on the activity level of the user.

The memory device 604, for instance, may store at one or more execution time points, program instructions for training a transformation model, a training data set for training the transformation model, program instructions for training a machine learning model such as a classification model that outputs features associated with input hyperspectral images, a training data set comprising labeled hyperspectral images for training the machine learning model, and program instructions for cognitive assistant, for example, as described herein. In another aspect, the training data sets may be stored in a persistent storage device 606 coupled with one or more hardware processors 602. The one or more hardware processors 602 may be also coupled with interface devices such as a network interface 608 for communicating with remote systems, for example, via a network, and an input/output interface 610 for communicating with input and/or output devices such as a keyboard, mouse, display, and/or others.

Yet in another aspect, one or more of the hardware processors 602 may be a processor running on a smartphone which captures the color image and performs some of the functions of the cognitive assistant locally at the smartphone.

Figure 7:
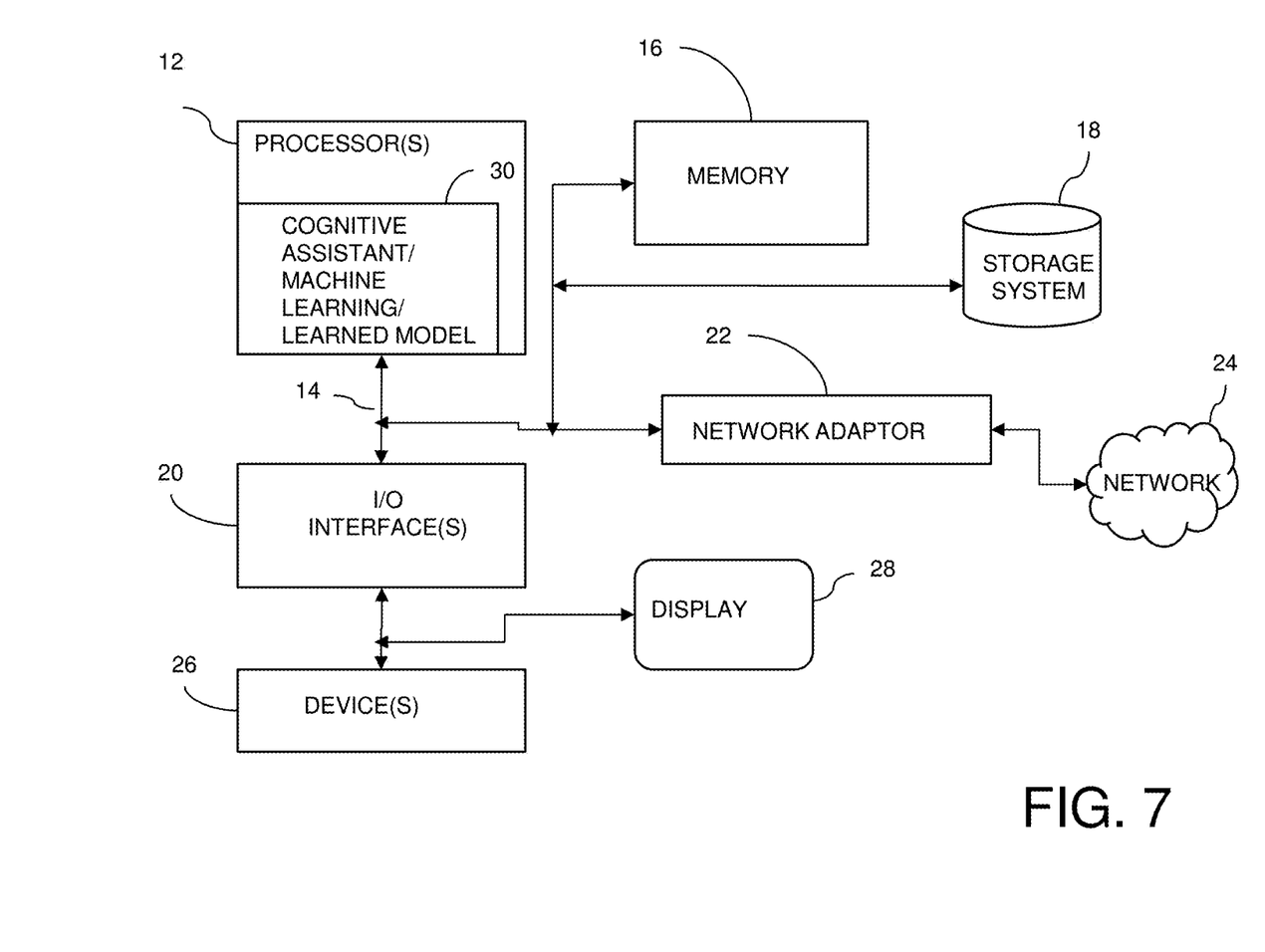
FIG. 7 illustrates a schematic of an example computer or processing system that may implement a cognitive assistant system in one embodiment of the present disclosure.

FIG. 7 illustrates a schematic of an example computer or processing system that may implement a cognitive assistant system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method executed by at least one hardware processor, comprising:
    receiving input comprising at least color images of food a user consumes, text information associated with the food and audio information associated with the food;
    converting the color images into hyperspectral images;
    generating output classification comprising at least taste, nutrient content and chemical composition features associated with the food the user consumes, by a machine learning model learned to classify input comprising the hyperspectral images;
    creating a database of food consumption pattern associated with the user based on the output classification features associated with the hyperspectral images, the text information and the audio information;
    determining a geographical location of the user;
    determining availability of local food at the geographical location;
    receiving as input a color image of the local food;
    converting the color image of the local food into a hyperspectral image;
    executing the machine learning model with the hyperspectral image of the local food as input, the machine learning model classifying the hyperspectral image of the local food into features comprising at least taste, nutrient content, and chemical composition;
    determining whether the features associated with the local food satisfy the food consumption pattern associated with the user specified in the database; and
    responsive to determining that the features associated with the local food satisfy the food consumption pattern associated with the user specified in the database, recommending the local food.

2. The method of claim 1, further comprising:
receiving a training data set comprising historical hyperspectral images labeled with classification features comprising at least taste, nutrient content, and chemical composition;
training a neural network based on the training data set, wherein the neural network receives as input the historical hyperspectral images and is trained to predict the labels comprising the classification features, by adjusting weights associated with nodes of the neural network that minimize a cost function of the neural network.

3. The method of claim 1, wherein the machine learning model is trained by sparse encoding.

4. The method of claim 1, wherein the determining whether the features associated with the local food satisfy the food consumption pattern associated with the user specified in the database further comprises determining whether the features associated with the local food meet medical dietary restriction of food intake associated with the user.

5. The method of claim 1, wherein the determining whether the features associated with the local food satisfy the food consumption pattern associated with the user specified in the database further comprises determining activity level of the user and wherein the recommending the local food is further based on the activity level of the user.

6. The method of claim 1, wherein the classification features further comprise plant family associated with the food and molecular composition associated with the food.

7. A computer program product comprising a computer readable storage medium having program instructions embodied therewith, the program instructions readable by a device to cause the device to:
determine a geographical location of the user;
determine availability of local food at the geographical location;
receive as input a color image of the local food;
convert the color image of the local food into a hyperspectral image;
execute a machine learning model with the hyperspectral image of the local food as input to the machine learning model, the machine learning model classifying the hyperspectral image of the local food into features comprising at least taste, nutrient content, and chemical composition, the machine learning model having been trained to classify input comprising hyperspectral images into classification features comprising at least taste, nutrient content, and chemical composition;
determine whether the features associated with the local food satisfy the food a consumption pattern associated with the user specified in a database; and
responsive to determining that the features associated with the local food satisfy the food consumption pattern associated with the user specified in the database, recommend the local food, the device further caused to:
receive input comprising at least color images of food a user consumes, text information associated with the food and audio information associated with the food;
convert the color images into hyperspectral images;
generate output classification comprising at least taste, nutrient content and chemical composition features associated with the food the user consumes, by the machine learning model learned to classify input comprising the hyperspectral images; and
create the database of food consumption pattern associated with the user based on the output classification features associated with the hyperspectral images, the text information and the audio information.

8. The computer program product of claim 7, wherein the device is further caused to:
receive a training data set comprising historical hyperspectral images labeled with classification features comprising at least taste, nutrient content, and chemical composition;
train a neural network based on the training data set, wherein the neural network receives as input the historical hyperspectral images and is trained to predict the labels comprising the classification features, by adjusting weights associated with nodes of the neural network that minimize a cost function of the neural network.

9. The computer program product of claim 7, wherein the machine learning model is trained by sparse encoding.

10. The computer program product of claim 7, wherein the device caused to determine whether the features associated with the local food satisfy the food consumption pattern associated with the user specified in the database further comprises the device caused to determine whether the features associated with the local food meet medical dietary restriction of food intake associated with the user.

11. The computer program product of claim 7, wherein the device caused to determine whether the features associated with the local food satisfy the food consumption pattern associated with the user specified in the database further comprises the device caused to determine an activity level of the user and wherein the device is caused to recommend the local food further based on the activity level of the user.

12. The computer program product of claim 7, wherein the classification features further comprise plant family associated with the food and molecular composition associated with the food.

13. A system comprising:
at least one hardware processor;
a memory device coupled to the at least one hardware processor;
the at least one hardware processor operable to at least:
receive input comprising at least color images of food a user consumes, text information associated with the food and audio information associated with the food;
convert the color images into hyperspectral images;
generate output classification comprising at least taste, nutrient content and chemical composition features associated with the food the user consumes, by a machine learning model learned to classify input comprising the hyperspectral images;
create a database of food consumption pattern associated with the user based on the output classification features associated with the hyperspectral images, the text information and the audio information;
determine a geographical location of the user;
determine availability of local food at the geographical location;
receive as input a color image of the local food;
convert the color image of the local food into a hyperspectral image;
execute the machine learning model with the hyperspectral image of the local food as input, the machine learning model classifying the hyperspectral image of the local food into features comprising at least taste, nutrient content, and chemical composition;

determine whether the features associated with the local food satisfy the food consumption pattern associated with the user specified in the database; and responsive to determining that the features associated with the local food satisfy the food consumption pattern associated with the user specified in the database, recommend the local food.

14. The system of claim 13, wherein the at least one hardware processor is further operable to:

receive a training data set comprising historical hyperspectral images labeled with classification features comprising at least taste, nutrient content, and chemical composition;

train a neural network based on the training data set, wherein the neural network receives as input the historical hyperspectral images and is trained to predict the labels comprising the classification features, by adjusting weights associated with nodes of the neural network that minimize a cost function of the neural network.

15. The system of claim 13, wherein the machine learning model is trained by sparse encoding.

16. The system of claim 13, wherein the at least one hardware processor determining whether the features associated with the local food satisfy the food consumption pattern associated with the user specified in the database further comprises determining whether the features associated with the local food meet medical dietary restriction of food intake associated with the user.

17. The system of claim 13, wherein the at least one hardware processor determining whether the features associated with the local food satisfy the food consumption pattern associated with the user specified in the database further comprises determining activity level of the user and wherein the at least one hardware processor recommends the local food further based on the activity level of the user.

18. The system of claim 13, wherein the classification features further comprise plant family associated with the food and molecular composition associated with the food.

19. The system of claim 13, wherein the at least one hardware processor trains a machine learning transformation model that converts the color image into the hyperspectral image based on a training set comprising a plurality of color images and hyperspectral images.

* * * * *